Patented Jan. 15, 1929.

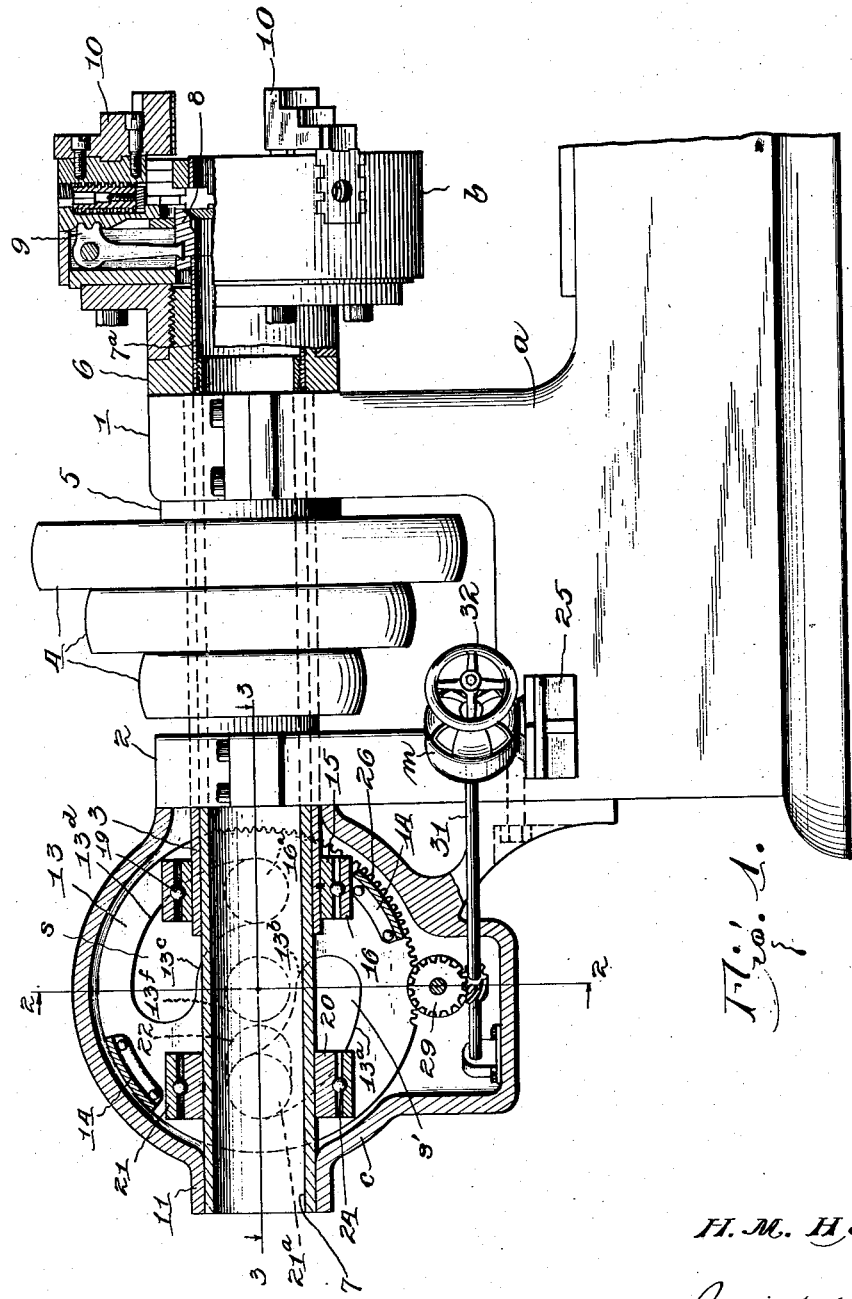

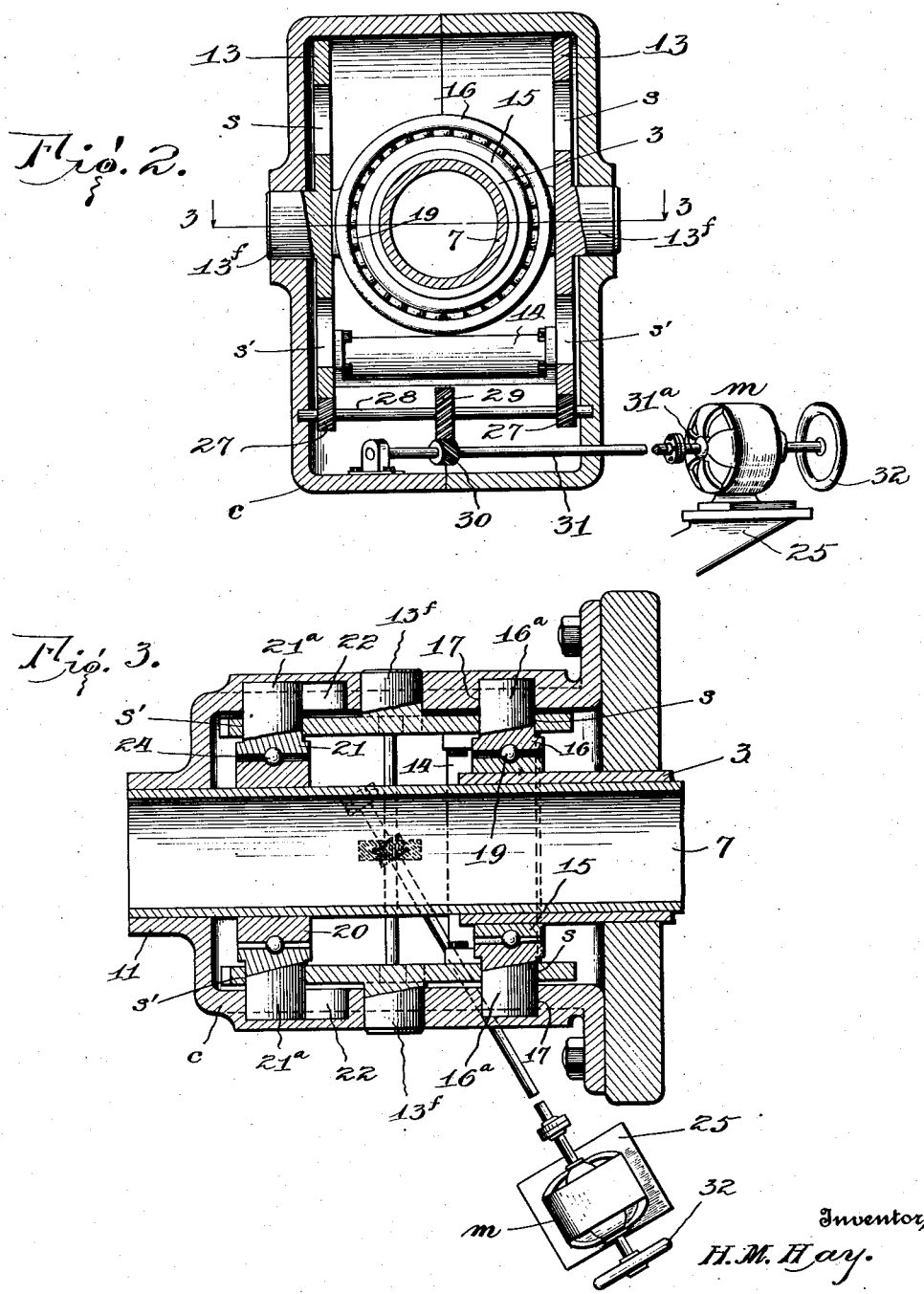

1,699,358

UNITED STATES PATENT OFFICE.

HOWARD M. HAY, OF WENONAH, NEW JERSEY.

CHUCK-OPERATING MEANS.

Application filed March 21, 1922, Serial No. 545,608. Renewed June 5, 1928.

This invention relates to power-operated chucks for lathes, boring machines, and the like, and it comprises means whereby the jaws of the chuck may be operated by hand or by a stationary motor either while the spindle is running or stopped. In accordance with the present invention, I provide a tubular plunger within the lathe spindle and operatively connected to the chuck jaws, and connections between the motor and plunger for actuating the plunger to close and open the jaws. In the embodiment of the invention herein shown, I provide, in a suitable casing, one or more cam wheels or disks which are geared to the motor, and a yoke or collar which is movable by the cam wheels to actuate the plunger and the chuck jaws, and upon the spindle is arranged a similar yoke or collar which abuts against concentric surfaces on the cam wheels, the arrangement being such that the thrust or endwise pressures of the plunger and spindle are applied equally and oppositely to diametrically opposite parts of the cam wheels, through anti-friction bearings arranged between the yokes and the spindle and plunger, respectively. Thus, friction is reduced to a minimum and the usual thrust collars on the spindle may be dispensed with, although I prefer to retain them so that they may function in case of excessive wear at the yokes and anti-friction bearings referred to.

In the accompanying drawing,

Fig. 1 is a side elevation, partly in central section, of a lathe head and chuck with hollow spindle equipped with my improvements for operating the chuck jaws;

Fig. 2 is a section on the line 2—2 of Fig. 1; and,

Fig. 3 is a section on the line 3—3 of Figs. 1 and 2.

Referring to the drawing, $a$ indicates a lathe head having bearings 1, 2, in which is mounted a hollow lathe spindle 3, carrying the chuck $b$. The spindle carries the usual driving pulleys 4, and has the shoulders 5 and 6 which are usually provided on opposite sides of the main bearing 1, for taking the end thrust of the spindle. Within the spindle is arranged a hollow plunger 7, connected by a sleeve $7^a$ to a ring 8 in the chuck which is engaged by the levers 9 which operate the chuck jaws 10. The plunger fits closely within the spindle and rotates with it and is movable longitudinally in the spindle to open and close the chuck jaws.

The spindle 3 extends beyond the bearing 2 into a casing $c$, which is secured to the lathe head, and the plunger 7 extends through the casing and into a bearing 11. Within the casing and lying in parallel planes on opposite sides of the plunger are cam disks 13, having hubs $13^f$ journaled in the sides of the casing. These cam wheels are alike and have alined slots $s$, concentric with their axis, and alined eccentric slots $s'$. The disks are preferably rigidly connected together by cross pieces 14.

Upon the spindle 3, within the casing, is rigidly secured a collar 15, and surrounding the collar is a ring or yoke 16, having diametrically opposite trunnions $16^a$, which extend through the concentric slots in the disks 13 and into sockets 17 in the side walls of the casing. The collar and the ring have raceways for receiving a series of anti-friction balls 19 and constitute with the balls an anti-friction radial and thrust bearing which permits free rotation of the spindle, while the trunnions, fitting closely within the concentric slots in the disks, prevent its endwise movement. The trunnions, which have a loose fit in the sockets 17, prevent rotation of the ring. Similarly, a collar 20 is secured to the hollow plunger, within the casing, and this collar is surrounded by a ring or yoke 21, having trunnions $21^a$ which project through the eccentric slots into guide slots 22 in the side walls of the casing, which guide slots extend parallel with the axis of the plunger. The ring and collar are formed with raceways for receiving a series of anti-friction balls 24, these elements constituting a radial and thrust bearing whereby the plunger may be moved endwise by moving the ring, the pintles of which slide in the slots 22.

When the cam disks are rotated in a clockwise direction, in Fig. 1, the outer walls $13^a$ of the eccentric slots bear against the trunnions $21^a$ and force the plunger to the right, thereby moving the levers 9 to open the chuck jaws; and when the cam disks are rotated in the opposite direction, the inner edges $13^b$ of the cam slots bear upon the trunnions $21^a$ and move the plunger to the left, thereby closing the jaws. The guide slots 22 permit the ring 21 and its trunnions to move longitudinally of the plunger without permitting rotation of the ring.

The thrust of the plunger is transmitted through the chuck to the hollow spindle, but this is held against endwise movement by the trunnions $16^a$, which fit closely within the concentric slots $s$. When the cam disks are moved in a direction to cause the plunger to move to the left, in Fig. 1, the hollow spindle will also be pressed toward the left, but it will be held against longitudinal movement by the engagement of the trunnions $16^a$ with the walls $13^c$ of the concentric slots $s$. When the plunger is moved to the right, pressure will be exerted on the hollow spindle, tending to pull it to the right, but this movement will be prevented by the engagement of the trunnions $16^a$ with the outer walls $13^d$ of the concentric slots $s$. Thus, the cam disks take the thrusts of the plunger and spindle which are applied equally and oppositely to the walls of the slots through the ball bearings and trunnions. The trunnions may, if desired, be provided with rollers to relieve the friction against the walls of the slots. The collars 5 and 6 on the spindle run close to the bearing 1, but are not subjected to end thrusts by the operation of the chuck, because all longitudinal stresses caused by operating the chuck are self-contained in the operating mechanism.

In order to operate the came disks, I provide a small stationary electric motor $m$, suitably supported on the lathe head as by a bracket 25, and the armature of this motor is geared to the cam disks by suitable speed reducing mechanism. As shown, the edges of the disks are formed with gear teeth 26, and these are engaged by pinions 27, upon a counter shaft 28, which is journaled in the sides of the casing $c$. A gear 29 is secured to the center of this shaft and is engaged by a pinion 30, upon a shaft 31, which is connected to and forms a continuation of the armature shaft $31^a$ of the motor. By causing the motor to operate in one direction, the chuck jaws will be moved inward, and by causing the motor to rotate in the opposite direction the jaws will be moved outward. The motor, for this purpose, is preferably one that can be stalled by the load without injury to the motor. Thus, after the chuck jaws have firmly gripped the work, the motor will stop but will continue to apply pressure through the cam disks to the jaws. The controlling mechanism for the motor is not shown. If desired, the gearing may be made self-locking, by the inclusion of a worm. Where the work operated upon in the lathe is thinned or weakened by boring or turning, and it is desired to lessen the pressure of the jaws upon the work, to prevent deforming it, the current may be cut off from the motor and the cam wheels may be turned to relieve the pressure on the jaws by a hand wheel 32 which is fitted on to the armature shaft.

The operation will be plain from the foregoing description. It will be noted that I have provided a power operated means for actuating the chuck jaws which does not obstruct the passageway through the spindle. A relatively small motor may be used for actuating the jaws, for the reason that there is only a small load on the motor until the jaws actually engage the work and the motor can run practically free and gain speed until this occurs. Should the supply of electric current fail, the jaws of the chuck may be opened and closed manually, by turning the hand wheel on the armature shaft.

What I claim is:

1. In a lathe, a hollow lathe spindle, a chuck thereon, a plunger extending through the spindle and operatively connected to the chuck jaws, thrust bearings on the rear ends of the spindle and plunger, and a cam member supported by the lathe head and adapted to apply pressure equally and oppositely to said bearings when said member is moved.

2. In a lathe, a hollow lathe spindle, a chuck thereon, a plunger extending through the spindle and operatively connected to the chuck jaws, thrust bearings on the rear ends of the spindle and plunger, and a cam member supported on the lathe head independently of the spindle and plunger, said member having cam surfaces engaging the bearing on the plunger for moving the latter endwise, and having other surfaces engaging the bearing on the spindle for resisting endwise movement of the latter.

3. In a lathe, a hollow lathe spindle, a chuck thereon, a plunger extending through the spindle and operatively connected to the chuck jaws, thrust bearings on the rear ends of the spindle and plunger, and a cam member rotatably supported on the lathe head, said member having eccentric surfaces engaging the bearing on the plunger for moving the latter and having concentric surfaces on the opposite side of its axis engaging the bearing on the spindle for resisting endwise movement of the latter.

4. In a lathe, a hollow lathe spindle, a chuck thereon, a plunger in the spindle operatively connected to the chuck jaws, a thrust bearing on the plunger comprising a yoke having trunnions at opposite sides of the plunger, means for preventing rotation of the yoke, means for moving the yoke to actuate the plunger comprising members rotatably mounted on opposite sides of the plunger and having cam surfaces for engaging said trunnions, and means for rotating said members.

5. In a lathe, a hollow lathe spindle, a chuck thereon, a plunger in the spindle operatively connected to the chuck jaws, thrust bearings on the plunger and spindle, each bearing comprising a yoke, said yokes having trunnions at their opposite sides, means for preventing rotation of the yokes, cam wheels rotatably mounted on opposite sides of the plunger and spindle, said wheels having eccentric slots into which the trunnions on the yoke of the plunger bearing extend, and having concentric slots, diametrically opposite said eccentric slots, into which the trunnions on the yoke of the spindle bearing extend, and means for rotating said cam wheels.

6. In a lathe, a hollow lathe spindle, a chuck thereon, a plunger extending through the spindle and operatively connected to the chuck jaws, thrust bearings on the rear ends of the spindle and plunger, and a member supported by the lathe head independently of the spindle and plunger and adapted to apply pressure equally and oppositely to said bearings when said member is moved.

In testimony whereof I affix my signature.

HOWARD M. HAY.